United States Patent [19]
Fowler

[11] Patent Number: 5,929,424
[45] Date of Patent: Jul. 27, 1999

[54] METHOD AND APPARATUS FOR READING A CODE PROVIDED ON A CODE CARRIER

[75] Inventor: Tim Fowler, Stafford, United Kingdom

[73] Assignee: Sick AG, Waldkirch/Breisgau, Germany

[21] Appl. No.: 08/855,177

[22] Filed: May 13, 1997

[30] Foreign Application Priority Data

May 14, 1996 [DE] Germany .......................... 196 19 479

[51] Int. Cl.⁶ .................................................... G06K 7/10
[52] U.S. Cl. ................... 235/462.32; 235/462.4
[58] Field of Search .................. 235/216 P, 454, 235/462.01, 463.32, 462.4

[56] References Cited

U.S. PATENT DOCUMENTS

| | | | |
|---|---|---|---|
| 4,766,297 | 8/1988 | McMillan | 235/455 |
| 5,557,093 | 9/1996 | Knowles et al. | 235/467 |
| 5,569,905 | 10/1996 | Ohkawa et al. | 235/467 |
| 5,589,680 | 12/1996 | Swartz et al. | 235/467 |
| 5,610,385 | 3/1997 | He et al. | 235/467 |
| 5,689,102 | 11/1997 | Schonenberg et al. | 235/467 |
| 5,814,799 | 9/1998 | Swartz | 235/383 |

FOREIGN PATENT DOCUMENTS

19504111 A1  8/1995  Germany .

OTHER PUBLICATIONS

Patent Abstracts of Japan, P–998, Jan. 30, 1990, vol. 14, No. 50 & JP 1–277980 A.

*Primary Examiner*—Donald Hajec
*Assistant Examiner*—Drew A. Dunn
*Attorney, Agent, or Firm*—Townsend and Townsend and Crew LLP

[57] ABSTRACT

A method and also an apparatus for reading a code provided on a code carrier and consisting of bright and dark fields is described, in which the code (14) is sensed by a laser beam, and the light which is reflected backwardly is evaluated in a light receiver arrangement. At least a part of the light which is differentially reflected at the scanned code fields and which would normally no longer return to the light receiver arrangement is returned via at least one preferably diffusely scattering reflective or retro-reflective surface into the scanned region, whereby this light is again reflected in different manner by the code fields, with the result that the contrast detected by the light receiver arrangement is significantly increased in dependence on the code fields.

19 Claims, 2 Drawing Sheets

METHOD AND APPARATUS FOR READING A CODE PROVIDED ON A CODE CARRIER

FIELD OF THE INVENTION

The present invention relates to a method and also to an apparatus for the reading of a code provided on a code carrier and consisting of bright and dark fields, in particular of a bar code in which the code is scanned with a light beam, such as, in particular, a laser beam, generated by a light transmitter and the light deflected back to a light receiver arrangement is evaluated.

DESCRIPTION OF PRIOR ART

Methods and apparatus of this kind are applied or used in various fields. The known apparatus of the named kind includes so-called bar code readers, which are used for the reading of codes formed from bright and dark bars. The dark fields can, however, for example, also be formed by apertures, provided it is ensured that no reflective materials are present behind the apertures. It is important that the incident light is more strongly absorbed by the dark fields and is more strongly reflected by the bright fields, whereby it is possible to distinguish between the different fields.

However, with the previously known code readers, the problem can arise that only a small part of the light which is incident onto a respective bright field passes back again to the light receiver arrangement when the surface nature of a code carrier is specularly reflecting or strongly reflecting. If, for example, the dark code fields are applied to a plain, polished metal surface, and the bright code fields are formed by this metal surface, then a situation can arise, as a result of the lack of diffuse reflectivity, in which only very little light passes back through the light receiver arrangement when the scanning beam is incident on a bright code field. A distinction between the light absorbing dark fields, on the one hand, and the bright fields, on the other hand, is thus no longer possible. Methods are admittedly known in which different printing colors are used and, in the reverse manner, in which the background is inversely colored. However, an additional effort is required for this.

OBJECT OF THE INVENTION

The object of the invention is to provide an improved method and also an improved apparatus of the initially named kind with which the code recognition is ensured in a simple and cost favorable manner and which is as free of errors as possible.

BRIEF DESCRIPTION OF THE INVENTION

This object is satisfied in accordance with the method of the invention in that at least a part of the differentially reflected light from the scanned code fields which no longer passes to the light receiving arrangement is returned through at least one reflecting surface into the scanned region, with this light being reflected anew and in a different manner by the code fields, with the contrast thereafter detected by the light receiving arrangement being substantially enhanced in dependence on the code fields. A preferred apparatus in accordance with the invention for carrying out the method is characterized in that with a scanning light beam directed at a specific angle of incidence onto the scanned region, the reflecting surface is so arranged that with an assumed mirror reflection in the scanned region the light beam reflected at the corresponding angle of emergence from the scanned region strikes the reflecting surface.

As a result of this design, a reliable code recognition is ensured even when the bright fields are formed by a specularly reflecting surface, such as, for example, a bare, polished metal surface of the code carrier, which can thus have a low diffuse reflectivity. The lack of diffuse reflection is compensated for in accordance with the invention in that light reflected from a respective bright field and not incident on the light receiving arrangement is at least partly deflected back again by the additionally provided reflecting surface onto the scanned region in such a way that it is reflected back again to the light receiver arrangement by the bright fields provided there. During the scanning of the respective bright field, there is thus a substantially enhanced light yield so that even under hitherto critical conditions a problem-free distinction is always ensured between the bright fields, on the one hand, and the light absorbing fields, on the other hand. An enhanced contrast between the bright and dark code fields results, in particular, when the dark fields are not completely light absorbing. This can be attributed to the fact that in accordance with the invention light originating from the bright fields is on the whole always more strongly reflected, whereas the light originating from the dark fields is on the whole always more weakly reflected.

A diffusely scattering, reflecting or retro-reflecting surface is preferably used as the reflecting surface. Thus, even with strongly specularly reflecting code carrier surfaces or with strongly specularly reflecting bright fields, it is always ensured that sufficient light still falls on the light receiver arrangement as soon as the scanning beam is directed onto a respective bright field.

The light yield can be further increased in that the additional reflective surface is arranged as close as possible to the scanned region.

With a scanning light beam directed at a specific angle of incidence onto the scanned region, the reflective surface is advantageously so arranged that, with an assumed specular reflection in the scanned region, the light beam reflected at the corresponding angle of emergence from the scanned region strikes the reflecting surface. In this case, a diffusely scattering reflecting surface or a retro-reflecting surface is again preferably used.

DESCRIPTION OF THE EXEMPLARY PREFERRED EMBODIMENTS

Figure 1:
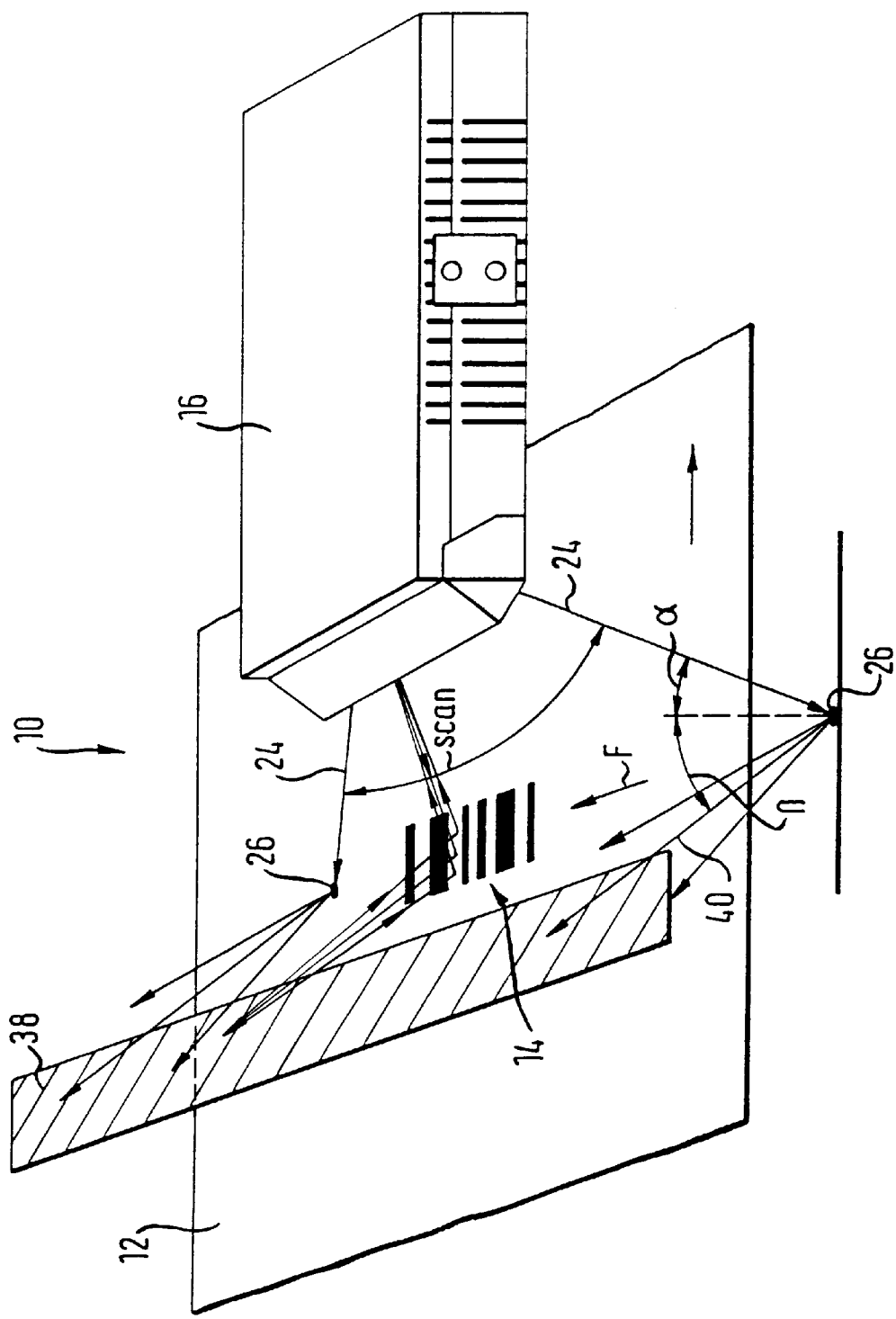
FIG. 1 is a simplified, purely schematic representation of a code reading apparatus of the invention.
Figure 2:
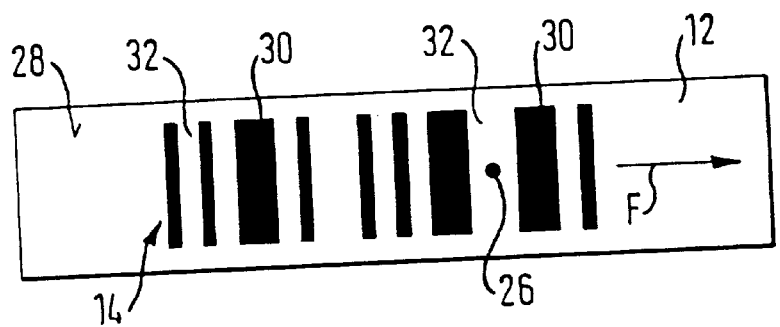
FIG. 2 is an example for a code arranged on a code carrier.

FIG. 1 shows in a simplified schematic manner an apparatus 10 for the reading of a code 14 provided on a code carrier 12 (see also FIG. 2).

The apparatus 10 comprises a transmitter-receiver part 16, having a light transmitter 18 and a light receiving arrangement 20, and also an electronic evaluation circuit 22 (see FIG. 3) connected after the light receiver arrangement 20. A deflecting unit, such as for example a mirror wheel, can be integrated into the transmitter-receiver part 16 in order to bring about a scanning movement of the relevant light beam over the code carrier.

The light transmitter 18 of the transmitter-receiver unit 16 delivers a light beam, in a preferred embodiment a laser beam 24, by which a light bead 26 is generated on the code carrier 12 with which the code 14 is scanned in the direction of the arrow F.

As can be seen with reference to FIG. 2, the code 14 in the present case is a bar code or stripe code, which is provided on a surface 28 of the code carrier 12. This code 14 includes, on the relevant surface 28 of the code carrier 12, a plurality of dark, bar-like fields 30, which may, for example, be printed into place, and also bright bar-like fields 32, which are formed directly by the surface 28 of the code carrier 18. The light bead 26 is moved transversely over the bar-like fields 30, 32 of the code 14, for example, in the direction designated by F (see FIGS. 1 and 2).

The bright fields 32, in particular reflect light to the light receiver arrangement 20, where this light is focused via a lens 34 onto a photodiode 36.

In accordance with FIG. 1 at least one preferably diffusely scattering reflective or retro-reflective surface 38 is provided, by which at least a part of the light reflected from the scanned code fields 30, 32 which does not fall on the light receiving arrangement 20, is reflected back into the scanned region having the code 14 in order to thereby increase the proportion of light detected by the light receiver arrangement 20.

This surface 38 which, in the present case, diffusely reflects light, is arranged close to the scanned region in which an image of the scanning bead 26 is formed on the code 14, i.e. in which the code is scanned.

The surface 38 which reflects by scattering, i.e. diffusely, can, for example, be a white surface, such as a surface formed, in particular, by white paper or the like. As already mentioned, a retro-reflecting surface can also be used. Such retro-reflecting surfaces are, for example, readily manufactured with reflective foils. With a retro-reflecting surface of this kind, a similar function can be achieved to that achieved with white paper, and indeed even with a greater separation of the surface from the code carrier. A retro-reflecting surface of this kind would thus, in particular, be expedient in the case in which the depth of focus, i.e. the range of spacing of the optical head from the code plane, can vary in use.

As can be seen with reference to FIG. 1, the scanning laser beam 24 transmitted from the transmitter-receiver part 16 is directed at a specific angle of incidence α onto the scanned region. The diffusely reflective surface 38 is thereby so arranged that, assuming specular reflection in the scanned region, a light beam 40 reflected at a corresponding angle of emergence β from the scanned region, in particular from a respective bright field 32, strikes the diffusely reflective surface 38.

Through the diffusely reflective surface 38, the incident light is at least partly scattered back into the scanned region again, where it also strikes a bright field 32. As a consequence, a corresponding proportion of the light likewise passes by specular reflection to the light receiving arrangement 20, whereby the proportion of light detected by the light receiver arrangement 20 is increased as a whole.

Figure 3:
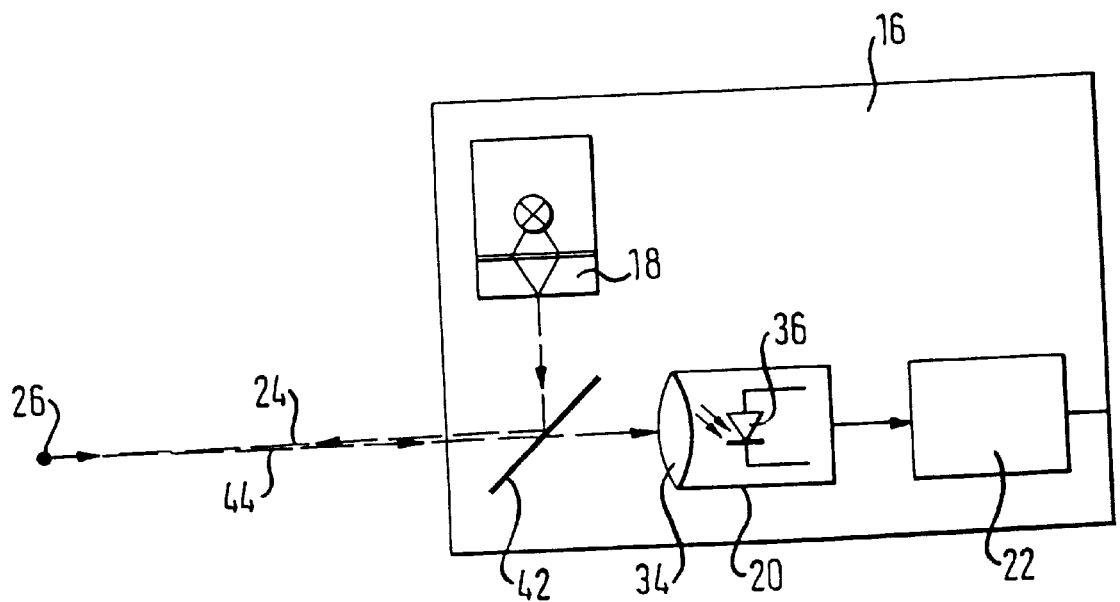
FIG. 3 is a block diagram of the transmitter and receiver part of the code reading apparatus.

In accordance with FIG. 3 the transmitter-receiver part 16 includes a beam divider 42, or a pupil division system (not shown, but with separated transmission and receiving pupils which can be placed close together) by which the laser beam 24 originating from the light transmitter 18 is deflected towards the code carrier to generate the light bead 26 which scans the code, and which transmits the received beam 44 so that the latter strikes the light receiver arrangement 20. In the present case, the transmitted beam and the received beam 24 and 44 respectively extend substantially parallel to one another.

The light receiving arrangement 20 still receives light from the bright fields 32, even if the latter are formed by a specularly reflecting surface without scattering capability. The lack of diffuse reflectivity is compensated for by the diffusely reflective surface 38, by which the light which is otherwise not detected by the light receiver arrangement 20 is reflected back into the scanned region, from where it passes, at least in part, to the light receiver arrangement 20.

Thus, when using the apparatus of the invention, an error-free reading of the code is ensured even when the latter is provided on a bare, polished metal surface, i.e. when the bright fields are formed by such a specularly reflecting surface.

I claim:

1. A method of reading a code provided on a code carrier, the code consisting of bright and dark fields, the method comprising:

scanning the code with a light beam generated by a light transmitter;

detecting a first portion of the light beam reflected off of the code carrier via a light receiver arrangement wherein light detected comprises differentially reflected light from scanned code fields; and, detecting a second portion of the light beam reflected off of the code carrier such as not to pass back to the light receiving arrangement;

wherein the second portion of the light beam is reflected toward at least one reflecting surface and is further reflected back into the scan region with the second portion being differentially reflected anew by the code fields, with the contrast thereafter detected by the light receiving arrangement and being substantially enhanced independence on the code fields.

2. A method in accordance with claim 1 wherein a diffusely reflecting surface is used as the reflective surface.

3. A method in accordance with claim 1 wherein the reflective surface is arranged close to the scanned region.

4. A method in accordance with claim 1 wherein a white surface is used as the reflecting surface.

5. A method in accordance with claim 4 wherein the white surface is a surface formed by white paper.

6. A method in accordance with claim 1 wherein a surface consisting of a retro-reflecting material is used as the reflecting surface.

7. A method in accordance with claim 1 wherein with a scanning light beam directed at a specific angle of incidence onto the scanned region, the reflecting surface is so arranged that with an assumed mirror reflection in the scanned region, the light beam reflected at a corresponding angle of emergence from the scanned region strikes the reflecting surface.

8. A method in accordance with claim 1 wherein the light beam is a laser beam.

9. A method in accordance with claim 1 wherein the code is a bar code.

10. Apparatus for the reading of a code provided on a code carrier, the code consisting of bright and dark fields, the apparatus comprising:

a light transmitter that generates a light beam for the scanning of the code;

a light receiver arrangement for reception of light that is reflected back from the code carrier;

at least one reflecting surface by which at least a part of differentially reflected light from scanned code fields that no longer passes through the light receiver arrangement is reflected back again into a scanned region of the code carrier;

wherein the part of the differentially reflected light is differentially reflected anew by the bright and dark fields; and wherein contrast detected by the light receiver arrangement is thereafter substantially enhanced independence on the bright and dark fields.

11. An apparatus in accordance with claim 10, wherein the reflecting surface is a diffusely reflecting surface.

12. An apparatus in accordance with claim 10, wherein the reflecting surface is arranged close to the scanned region.

13. An apparatus in accordance with claim 10, wherein the reflecting surface is a white surface.

14. The apparatus in accordance with claim 13 wherein the white surface is a surface formed by white paper.

15. An apparatus in accordance with claim 10, wherein the reflecting surface is a surface consisting of a retro-reflecting material.

16. An apparatus in accordance with claim 10, wherein the scanning light beam is directed at a specific angle of incidence onto the scanned region, and the reflecting surface is so arranged that, with an assumed mirror reflection in the scanned region, the light beam reflected at a corresponding angle of emergence from the scanned region is incident onto the reflecting surface.

17. The apparatus in accordance with claim 16 wherein the corresponding angle of emergence from the scanned region is at substantially normal incidence onto the reflecting surface.

18. The apparatus of claim 17 wherein the light beam is a laser beam.

19. The apparatus of claim 17 wherein the code is a bar code.

* * * * *